Feb. 24, 1959 F. SUND 2,874,824
FLEXIBLE FIN DRAPER
Filed March 29, 1955 2 Sheets-Sheet 1

INVENTOR
FRED SUND
BY
Williamson, Schroeder, Adams & Meyers
ATTORNEYS

Feb. 24, 1959 F. SUND 2,874,824
FLEXIBLE FIN DRAPER
Filed March 29, 1955 2 Sheets-Sheet 2
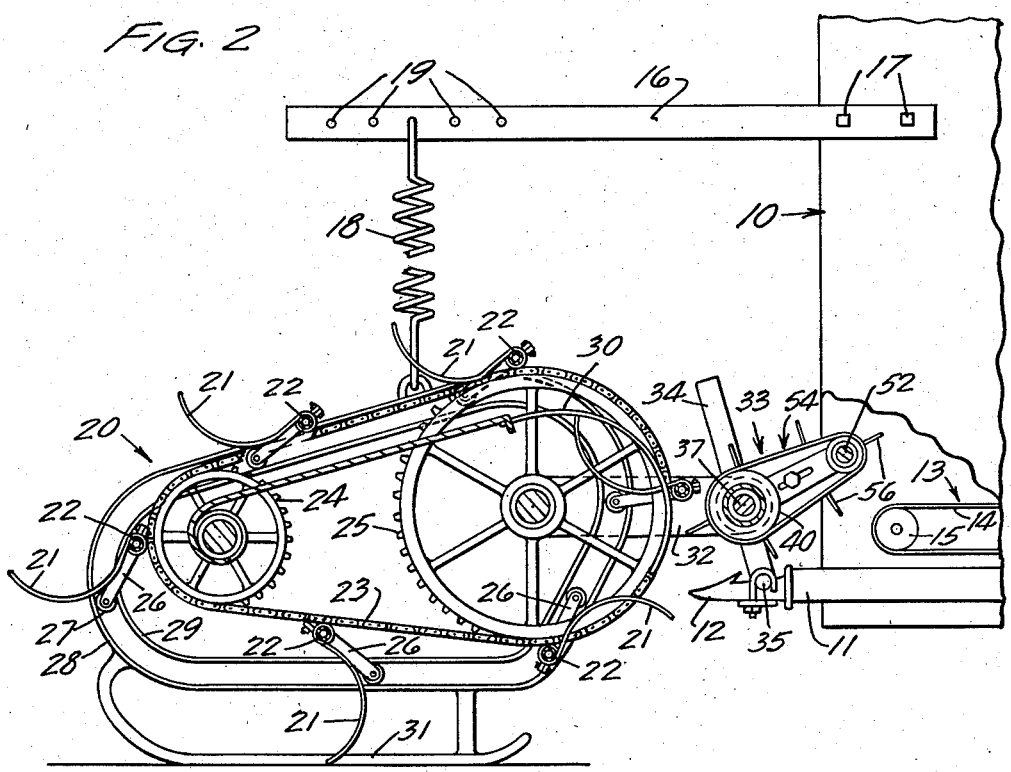
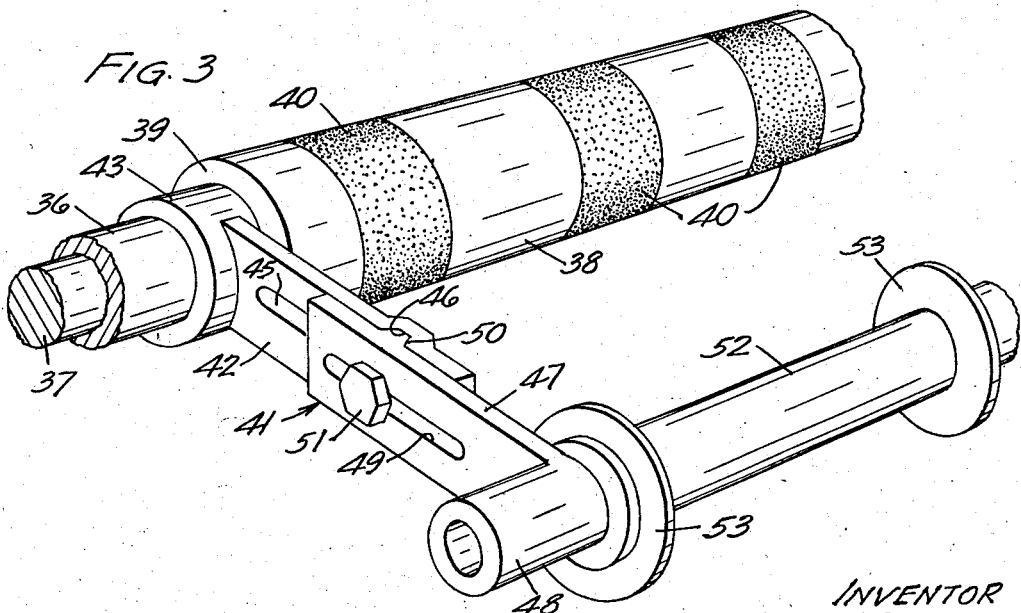
INVENTOR
FRED SUND
BY
Williamson, Schroeder, Adams & Meyers
ATTORNEYS

United States Patent Office 2,874,824
Patented Feb. 24, 1959

2,874,824

FLEXIBLE FIN DRAPER

Fred Sund, Newburg, N. Dak.

Application March 29, 1955, Serial No. 497,539

3 Claims. (Cl. 198—203)

This invention relates to a pick-up attachment for combines, and more particularly to a novel flexible fin draper mechanism in the attachment.

Many conventional threshing implements known as combines are constructed so that they will cut and thresh the standing grain simultaneously during travel of the implement over a field. However, since grain which is ripe enough to be threshed often is not in proper condition to be cut, it has become a common practice to cut and windrow the grain before it becomes lodged and before it begins to shell out in the field. At a convenient later time, the combine is then used to thresh the grain as it is picked up from the windrows. The combine then must be provided with pick-up means which will deliver the cut grain to the platform of the combine where it will be subsequently threshed in the same manner as before.

A number of prior art devices have been proposed for attachment to the front end of a combine to adapt the machine for raking and picking up cut grain in place of cutting the grain at the same time it is threshed. A part of such devices includes a beater or feeder bar which transfers the grain and straw from the pick-up mechanism to the platform of the combine. Where such beater or feeder bar portion of the pick-up attachment was mounted on a single axis, it was necessary to provide a limited diameter of the beater or feeder bar to avoid picking straw from the combine platform and returning it to the ground. In order for this type of beater to function properly, the pick-up attachment was required to be positioned as close to the combine as possible, necessitating removal of the sickle guards under the beater mechanism. Furthermore, this type of beater in a pick-up attachment typified by the device disclosed in my prior Patent No. 2,284,777, had a tendency to permit straw to wind and tangle around itself, and the operation thereof required timing of the rigid beater fins to avoid striking pick-up tooth structures as they delivered the windrowed straw to the beater. Early experiments made by me in developing a belt-type draper substituted for the single axis beater were not successful since the timing of the passage of fins with respect to the revolutions of the pick-up teeth was difficult to maintain. Furthermore, the diameter of the belt shafts and their comparatively long unsupported lengths made difficult the proper cooperative operation of the pick-up and draper. The draper belt would not track uniformly and a belt tightener could not be externally supplied because of the outwardly extending fins attached to the belt. Adjustment of the entire belt shafts in their relative spaced relation merely caused uncontrolled bowing of the long shafts, particularly in the medial regions.

The present invention contemplates a pick-up attachment for combines in which the pick-up tooth mechanism may be similar to that disclosed in the above mentioned United States Patent No. 2,284,777, but in which a novel flexible fin draper has been combined therewith so as to overcome the above noted objections. It is, therefore, an important object of the invention to provide a pick-up attachment which will positively and efficiently pick up and deliver previously cut grain to a combine platform.

It is another object of the invention to provide a pick-up attachment in which a finned flexible belt assembly will uniformly wipe and properly transfer cut grain for the width of the pick up and across the span separating the pick-up mechanism from the combine platform without requiring tightening adjustment and, consequently, bending stress on the belt-supporting shafts.

It is another object of the invention to provide a flexible fin draper which will consistently wipe and transfer straw from the pick-up teeth of a combine attachment to the combine platform, irrespective of the horizontal positioning of the platform.

It is a further object of the invention to provide a finned draper of the class described which will not require timing in connection with the cycle of operation of the pick-up teeth in the attachment.

A still further object of the invention is to provide a pick-up attachment adaptable to a number of conventional combines in which cut and windrowed grain can be easily and efficiently transferred to the combine platform without necessitating the removal of sickle guards when the attachment is mounted and used.

These and other objects and advantages of my invention will more fully appear from the following description, made in connection with the accompanying drawings wherein like reference characters refer to the same parts throughout the several views and in which:

Fig. 2 is a vertical section of the fin draper mechanism taken on the line 2—2 of Fig. 1, mechanism unessential to this invention being shown somewhat diagrammatically and segmented to condense portions thereof;

Fig. 3 is an enlarged fragmentary perspective view of the draper shafts and mounting structure, the fin draper belt itself having been removed therefrom.

Figure 1:
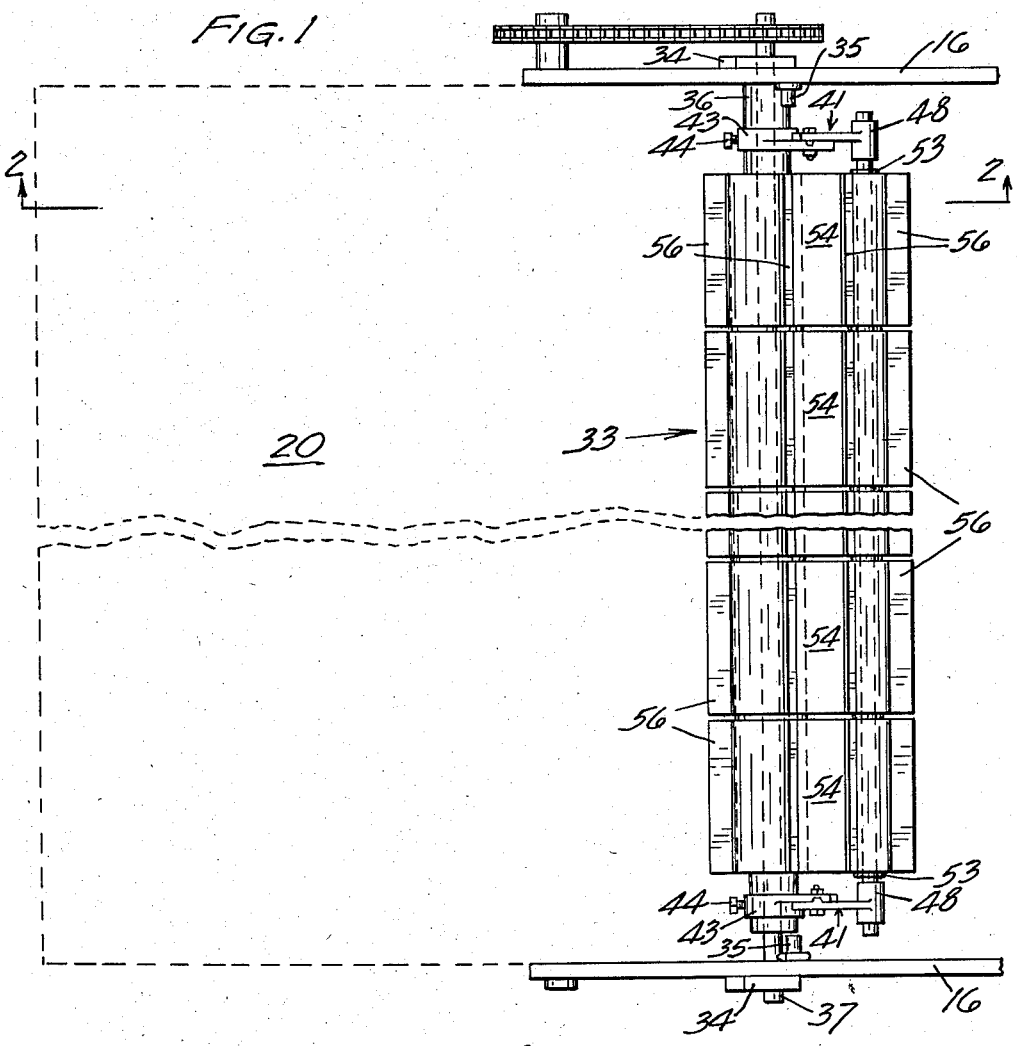
Fig. 1 is a top view of my pick-up attachment secured to the front end of a combine, the attachment being medially segmented and unessential portions of the pick-up tooth mechanism and conventional combine being deleted from the view, but indicated in dotted outline.

With continued reference to the drawings, it is contemplated that a conventional combine 10 be adapted to picking up previously cut grain so that the sickle mechanism 11, together with sickle guard means 12, need not be dismantled from the combine when it is used for picking up such windrowed grain. The combine 10 thus remains ready to be used for cutting and threshing standing grain at any time that it is desired to reconvert the equipment. The combine 10 is provided with the conventional platform 13 having a rearwardly traveling means, e. g. belt 14, journaled between transverse rollers 15, the forwardmost of which is shown in Fig. 2. It is proposed to mount a bar or bracket 16 by such means as bolts 17 to the forward portion of combine 10 so that a tension spring 18 may be adjustably positioned through one of the openings 19 formed along the outer end of bar 16, as shown in Fig. 2. The lower end of the tension spring 18 is adapted to partially support a raking pick-up device shown generally at 20.

The raking pick-up may be any device suitable for bringing cut grain upwardly and rearwardly by continuous movement to a position overlying the sickle guards 12 and to be further transferred as will be subsequently disclosed, through my invention and to the combine platform 13. The raking pick-up 20 is of the general type disclosed in my prior United States Patent No. 2,284,-

777 and briefly constitutes a plurality of curved teeth 21 mounted on transverse bars 22 which are journaled across flexible belt members 23 and caused to travel in a path about forward sprockets 24 and rearward sprockets 25. Each of the transverse bars 22 is provided at its outer ends with a rigid radius arm 26 which has a cam roller 27 journaled at its outer end. Each cam roller 27 is adapted to follow in spaced relation with its neighboring transverse bar 22 and plurality of curved teeth 21 affixed thereto. Each cam wheel travels in a pathway defined by an outer track 28 and an inner track 29. The tracks substantially coincide with the travel of the belts 23 for only a short distance and elsewhere deviate therefrom so as to cause the rigid radius arm 26 to oscillate and orient the teeth 21 as the belt travels about the sprockets 24 and 25. The sets of teeth associated with its transverse rod 22 are thus caused to assume a depending position during the lowermost portion of their cycle and move forwardly, then upwardly to rake and lift the cut grain from windrows on the field surface. The grain is then moved rearwardly on the teeth in their uppermost position until they begin to descend around the rear curvature of the sprocket wheels 25 where the cam wheels 27 are caused to extend inwardly from the travel of belts 23 and cause the teeth 21 at this point of travel to swing inwardly from the circumferential path defined by belts 23. A plurality of stripping rods 30 are mounted in alternate relation with the teeth 21 and are curved rearwardly and downwardly, as shown in Fig. 2, so that cut grain cradled on the uppermost teeth will be transferred to the stripping rods as the teeth pass rearwardly and downwardly. The transverse bar 22 to which each set of teeth 21 is attached will, of course, ride closely over the surface of the curved stripping rods 30. Ground-contacting members 31 are employed to cause the raking pick-up 20 to move over the surface of a field at a fixed elevation in respect thereto.

The raking pick-up 20 is secured forwardly of the combine 10 through mounting members 32, as shown in Figs. 1 and 2. Details of the mount and function thereof are disclosed more fully and claimed in a copending application.

The particular novel portion of the pick-up attachment to which this application is directed concerns a flexible fin draper which is interposed between the raking pick-up 20 and the combine platform 13, as shown in Figs. 1 and 2 and indicated generally by the number 33. The flexible fin draper is mounted on a pair of spaced standards 34 which are secured at the respective sides at as 35 adjacent the sickle guards 12, as shown in Figs. 1, 2 and 3. The drive shaft is preferably provided with an enlarged cylindrical portion 38 having a shoulder 39 at each end which is adapted to abut against journal 36. The circumferential surface of the enlarged cylindrical portion 38 is provided with means for positively driving the flexible fin draper as will be subsequently described, and such means may comprise a series of spaced bands 40 having an abrasive or roughened surface.

At each side of the device is mounted a radial bracket 41 which is separable in nature and has a first bracket arm 42 terminating in a rigid collar 43 which is adapted to encircle the journal 36 and secured adjustably thereon by such means as set screw 44, as shown in Fig. 1. The arm 42 has a longitudinal slot 45 and a transverse groove 46, as shown in the enlarged fragmentary view of Fig. 3.

The second portion of the radial bracket 41 comprises a rigid arm 47 which terminates outwardly in a rigid journal 48 and is further provided with a longitudinal slot 49 adapted to overlie in registry the slot 45 of arm 42. The arm 47 further has a transverse rib 50 which is adapted to be received in the groove 46 when the bracket is in extended and operable position. A bolt and nut 51 is adapted to be inserted through the registered grooves 45 and 49 to maintain the arm portions 42 and 47 in rigid alignment. It is understood, of course, that each of the bracket arms is similarly constructed, one being disposed on the journal 36 at one side of the apparatus and the other being disposed on a similar journal 36 and in the same radial position at the other side of the apparatus so that the journals 48 will be in alignment.

Journaled for free rotation across the outer ends of radial bracket arms 41 and in the journals 48 is an idler shaft 52, as shown in Figs. 1, 2 and 3. Idler shaft 52 may be provided with a series of spaced guide flanges 53 where a plurality of fin draper belts are employed rather than a single belt. The spacing between the guide flanges 53 are such as to align with one or more of the anti-friction circumferential areas 40 on the drive shaft 37, as previously described. In mounted condition, the idler shaft 52 will lie in spaced parallel relation rearwardly of the drive shaft 37, as shown in Figs. 1 and 2.

Figure 4:
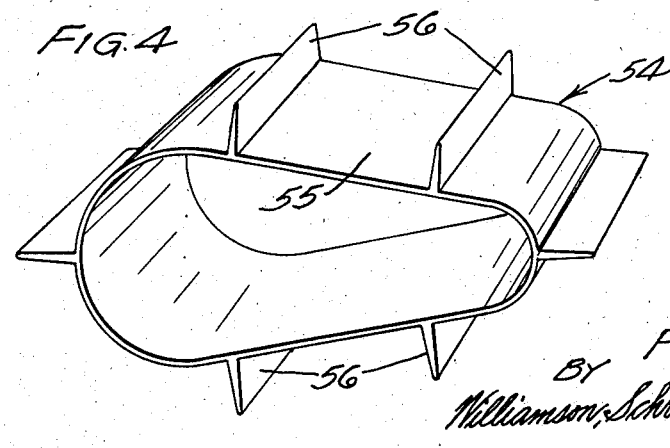
Fig. 4 is an enlarged perspective view of a fine draper belt employed in my invention.

The fin draper belt means may comprise a single belt or a plurality of belts 54, as shown in Fig. 1. I find it convenient to use a plurality of draper belts of a width such as will amount to a unit in the common denominator of various widths in the combine structure. Since most of the required widths are in even feet measurements, I prefer to supply each belt in substantially one foot widths. The fin draper belt itself is shown in enlarged view in Fig. 4, and comprises a flexible endless loop 55 which may be formed of resilient material such as rubber or rubberized fabric. The belt loop 55 has secured transversely thereof at a multiplicity of spaced positions, upstanding fin members 56 which are of flexible nature, yet sufficiently resilient to assume their upstanding position when not in contact with a retarding influence. The relative positions of the individual fin draper belts are shown in Figs. 1 and 2.

In the use and operation of my pick-up attachment with the flexible fin draper device, the mounting brackets 41 are oriented about their respective journals 36 so as to permit the proper angle for elevating the idler shaft 52 over the combine platform 13. The set screws 44 are then tightened so as to maintain this elevation and the arms 47 will be loosened from their respective fastening positions by partially unscrewing the bolt and nut members 51. A flexible fin draper belt 54 is positioned, one between each set of guide flanges 53 and adapted to lie around the anti-slip means 40 on the enlarged cylindrical portion 38 of drive shaft 37, whereupon the bracket arms 47 are extended to their predetermined position and the bolt and nut members 51 are tightened to secure the bracket in rigid radial alignment with the respective journals 36. The individual loops 55 of fin draper belts 54 will have all slack removed therefrom but will not be placed under tension. I have found that if any degree of tension is applied between the shafts 37 and 52, it will cause the shafts to bend convergently and thereby create a non-uniformity of operation. On the other hand, where I employ positive gripping means such as the abrasive bands 40, no bowing or bending is experienced and the shafts ride smoothly in their journals with the flexible fin draper belts in uniform and proper working condition.

The entire combine 10 is then caused to travel over a field having windrows of cut grain which is picked up in a manner taught by the prior art and delivered to the stripper bars 30. The fins 56 will travel in an upward direction about the shaft 37 and will wipe the rear surfaces of the stripper bars 30 so as to lift the cut grain and transport it upwardly and rearwardly on the draper belt. As each of the transverse rods 22 pass over the stripper rods 30, the flexible fins will merely bend and wipe over the rods without interrupting the operation thereof, nor damaging any of the mechanism. The cut grain is then delivered to a position above the combine platform where it may be further transported to the threshing mechanism of the combine (not shown) through means of rearwardly traveling belt 14.

It may thus be seen that I have provided a simple and efficient draper device which need not be timed with the cycle of the raking pick-up mechanism, but which will yieldably contact the moving members as well as the stripper structure to positively wipe and transport cut grain rearwardly over the sickle guards and directly upon the top of the combine platform.

It will be further observed that the unique positioning and adjustment of the fin draper is such as to obviate the necessity for removing the sickle guards from the conventional combine and further can be elevated or lowered to suit the horizontal positioning of the combine platform without disturbing the function of the raking pick-up mechanism.

It will, of course, be understood that various changes may be made in the form, details, arrangement and proportions of the parts without departing from the scope of my invention.

What I claim is:

1. A draper mechanism for transferring cut grain from a raking pick-up rearwardly to the platform of a conventional combine, said draper mechanism comprising, a journal mounted rearwardly and to each side of the raking pick-up, an elongated driving shaft journaled across said journals in close spaced relation with the rearmost portion of the raking pick-up, a journal separably mounted at a fixed distance rearwardly of each of said first mentioned journals, an idler shaft rotatably journaled across said separable journals and in overlying relation with respect to the combine platform, resilient endless belt means drivably mounted around said driving and idler shafts, a plurality of outwardly disposed flexible fins secured to the endless belt means and adapted to yieldably contact the rear portion of said raking pick-up, and anti-friction means circumferentially secured to said driving shaft along the length thereof for maintaining positive driving movement to said endless belt means without varying the tension on said belt means along the length of contact with the driving shaft.

2. A draper mechanism for transferring cut grain from a raking pick-up rearwardly to the platform of a conventional combine, said draper mechanism comprising, an elongated driving shaft horizontally and transversely journalled in close spaced relation with the rear of the raking pick-up, a shaft horizontally journalled rearwardly in parallel relation to said driving shaft and in elevated relation with respect to the combine platform, a plurality of endless and resilient belts secured around said shaft and in driven contact under light tension with said driving shaft, a plurality of flexible fins secured to each endless belt and extending outwardly to physically contact and wipe the raking pick-up, and a roughened anti-slip area formed along said elongated driving shaft and adapted to contact the surface of each of said flexible and resilient belts whereby to provide positive drive of each of said belts without causing bending of said drive shaft and attendant uneven seating of cut grain picked up by the flexible fins in a wiping action as the belts travel about said shaft.

3. In a draper mechanism having a plurality of externally finned flexible belts for transferring cut grain from a raking pick up rearwardly to the platform of a conventional combine, a mounting for said belts comprising an elongated idler shaft journaled transversely of said pick up and said platform, and an elongated drive roller journaled parallel to the idler shaft, said drive roller having along its length roughened circumferential area for engaging simultaneously the inner surfaces of said plurality of finned flexible belts and for exerting independent driving torque thereon, said belts being maintained substantially without tension so as not to flex said idler shaft.

References Cited in the file of this patent

UNITED STATES PATENTS

| | | |
|---|---|---|
| 1,353,074 | Sgritta | Sept. 14, 1920 |
| 1,928,236 | Thoen | Sept. 26, 1933 |
| 2,305,044 | Toews | Dec. 15, 1942 |
| 2,795,100 | Sund | June 11, 1957 |

FOREIGN PATENTS

| | | |
|---|---|---|
| 202 | Great Britain | 1903 |